United States Patent
Peiffer et al.

(10) Patent No.: US 8,981,030 B2
(45) Date of Patent: Mar. 17, 2015

(54) SEALANTS

(75) Inventors: Evelyn Peiffer, Leverkusen (DE); Mathias Matner, Neuss (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/514,742

(22) PCT Filed: Dec. 6, 2010

(86) PCT No.: PCT/EP2010/068952
§ 371 (c)(1),
(2), (4) Date: Jun. 8, 2012

(87) PCT Pub. No.: WO2011/069954
PCT Pub. Date: Jun. 16, 2011

(65) Prior Publication Data
US 2012/0245279 A1    Sep. 27, 2012

(30) Foreign Application Priority Data
Dec. 9, 2009 (DE) .................. 10 2009 057 599

(51) Int. Cl.
| | |
|---|---|
| C08G 77/06 | (2006.01) |
| C08G 18/48 | (2006.01) |
| C08G 18/28 | (2006.01) |
| C08G 18/71 | (2006.01) |

(52) U.S. Cl.
CPC .......... *C08G 18/4825* (2013.01); *C08G 18/282* (2013.01); *C08G 18/718* (2013.01); *C08G 2190/00* (2013.01)
USPC ........................................................ 528/29

(58) Field of Classification Search
USPC ........................................................ 528/29
See application file for complete search history.

(56) References Cited

U.S. PATENT DOCUMENTS

| | | | |
|---|---|---|---|
| 3,627,722 | A | 12/1971 | Seiter |
| 3,632,557 | A | 1/1972 | Brode et al. |
| 4,146,585 | A | 3/1979 | Ward et al. |
| 5,158,922 | A | 10/1992 | Hinney et al. |
| 5,364,955 | A | 11/1994 | Zwiener et al. |
| 2001/0031848 | A1 | 10/2001 | Windmueller et al. |
| 2004/0127671 | A1* | 7/2004 | Roesler et al. ............. 528/38 |
| 2007/0055035 | A1* | 3/2007 | Ludewig et al. ........... 528/29 |
| 2010/0209613 | A1* | 8/2010 | Rong et al. ................ 427/387 |
| 2010/0216925 | A1* | 8/2010 | Yano ......................... 524/178 |
| 2010/0280209 | A1 | 11/2010 | Braun et al. |
| 2011/0107463 | A1 | 5/2011 | Tanaka |

FOREIGN PATENT DOCUMENTS

| | | | |
|---|---|---|---|
| DE | 102007039648 | * | 2/2009 |
| EP | 0596360 | A1 | 5/1994 |
| EP | 0654302 | A1 | 5/1995 |
| EP | 1136495 | A2 | 9/2001 |
| EP | 1591464 | A1 | 11/2005 |
| EP | 1924621 | A1 | 5/2008 |
| WO | WO-2007/025668 | A1 | 3/2007 |
| WO | WO-2008/036364 | A1 | 3/2008 |
| WO | 2009/011329 | * | 1/2009 |
| WO | WO 2009/071542 | A1 | 6/2009 |

OTHER PUBLICATIONS

International Search Report for PCT/EP2010/068952 mailed Mar. 3, 2011.
International Preliminary Report on Patentability for PCT/EP2010/068952 mailed Mar. 3, 2011.

* cited by examiner

*Primary Examiner* — Margaret Moore
(74) *Attorney, Agent, or Firm* — Drinker Biddle & Reath LLP

(57) ABSTRACT

The invention relates to alkoxysilane groups comprising prepolymers and the use thereof as binding agents for sealants. More specifically the invention relates to alkoxysilyl polyurethanes prepared from a polyol having a number-average molecular weight of from greater than 20,000 to 30,000 and an isocyanate alkoxysilane.

11 Claims, No Drawings

SEALANTS

RELATED APPLICATIONS

This application is a national stage application (under 35 U.S.C. §371) of PCT/EP2010/068952, filed Dec. 6, 2010, which claims benefit of German Patent Application No. 10 2009 057 599.5, filed Dec. 9, 2009.

The present invention relates to polyurethanes modified with alkoxysilane groups and to their use as binders for sealants.

Alkoxysilane-functional polyurethanes which crosslink by silane polycondensation have long been known. A review article on this subject can be found for example in "Adhesives Age" 4/1995, page 30 ff. (authors: Ta-Min Feng, B. A. Waldmann). Such alkoxysilane-terminated, moisture-curing one-component polyurethanes are increasingly being used as flexible coating, sealant and adhesive compositions in construction and in the automotive industry.

Production methods for such alkoxysilane-functional polyurethanes are described in a number of publications, inter alia in U.S. Pat. No. 3,627,722 or U.S. Pat. No. 3,632,557. The disadvantage of these methods is however the high resultant viscosity, which requires the use of solvents, or, in the case of low viscosity, the poor suitability for use in low-modulus sealants.

U.S. Pat. No. 3,627,722 and EP-A 0 596 360 for example describe various attempts to reduce the viscosity, all of which have the disadvantage however that the production of alkoxysilane-functional polyurethanes involves intermediate stages which are very unstable and thus present a high safety risk and severely restrict the reproducibility of the reactions.

These disadvantages are avoided by the method described in EP-A 1 924 621, but the products described here have a limited ability to be formulated as a low-modulus sealant. The relatively high modulus values place severe restrictions on the formulation and large amounts of plasticiser and specific aminosilanes have to be used in order to be able to formulate a low-modulus sealant.

Similar systems are also described in EP-A 1 591 464, but the examples shown there reach a relatively high 100% modulus of 0.85 MPa (Example 8) with 30 wt. % of plasticiser or of 0.41 MPa in Example 23, where in addition to 23 wt. % of plasticiser a monofunctional polymer is necessary as a reactive plasticiser.

Common to all of these examples is the fact that the requirement of ISO 11600 for low-modulus sealants (100% modulus of max. 0.4 MPa) is not satisfied or that large amounts of plasticiser are necessary in order to comply with the standard. However, this increases the risk of staining at the joint edges due to migration of the plasticiser into the marginal zones of the joined substrates (Praxishandbuch Dichtstoffe, IVK, 4th edition, p. 1390.

The object of the present invention was therefore to provide polyurethanes modified with alkoxysilane groups which even with the use of small amounts of plasticiser allow a broad variation in the formulation of low-modulus sealants.

BRIEF SUMMARY OF THE INVENTION

It has now been found that prepolymers can be produced with the required properties by reacting polyethers having a number-average molecular weight of >20,000 g/mol with OH-reactive silane structural units.

The invention therefore provides polyurethanes modified with alkoxysilane groups which are obtainable by reacting components A and B in a urethanisation reaction:

A) 1.0 val of a polyol component having a number-average molecular weight of >20,000 g/mol to 30,000 g/mol, containing one or more polyoxyalkylene polyols or polyoxyalkylene polyol prepolymers and B) 0.80 to 1.20 val of a compound of formula (I) having isocyanate and alkoxysilane groups

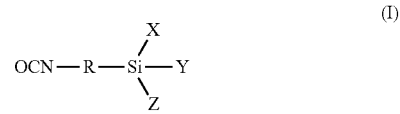

in which

X, Y, Z are independently of one another linear, cyclic or branched $C_1$-$C_8$ alkyl or $C_1$-$C_8$ alkoxy radicals, at least one of the radicals being a $C_1$-$C_8$ alkoxy group, and X, Y or Z can also independently of one another be bridged, R is any at least difunctional organic radical, preferably a straight-chain, branched or cyclic alkylene radical having 1 to 8 carbon atoms.

X, Y and Z in formula (I) are preferably independently of one another methoxy or ethoxy.

A methylene or propylene radical is particularly preferred for the radical R.

Component A) preferably has a number-average molecular weight of 21,000 g/mol to 25,000 g/mol.

The invention also provides sealants based on the alkoxysilane-modified polyurethanes according to the invention which have a modulus at 100% elongation of a maximum of 0.4 N/mm$^2$ (according to ISO 11600) and which contain a maximum of 30 wt. % of plasticiser, preferably a maximum of 25 wt. % of plasticiser, particularly preferably a maximum of 20 wt. % of plasticiser.

EMBODIMENTS OF THE INVENTION

An embodiment of the invention are alkoxysilane-group-modified polyurethanes obtainable by reacting A) 1.0 val of a polyol component having a number-average molecular weight of >20,000 g/mol to 30,000 g/mol, containing one or more polyoxyalkylene polyols or polyoxyalkylene polyol prepolymers and B) 0.80 to 1.20 val of a compound of formula (I) having isocyanate and alkoxysilane groups

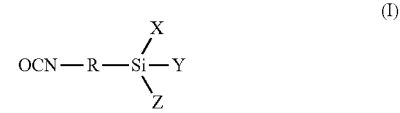

in which

X, Y, Z are independently of one another linear, cyclic or branched $C_1$-$C_8$ alkyl or $C_1$-$C_8$ alkoxy radicals, at least one of the radicals being a $C_1$-$C_8$ alkoxy group, and X, Y or Z can optionally independently of one another be bridged, and R is any at least difunctional organic radical, preferably a straight-chain, branched or cyclic alkylene radical having 1 to 8 carbon atoms.

In another embodiment the Alkoxysilane-group-modified polyurethanes are characterised in that X, Y and Z in formula (I) are independently of one another a methoxy or ethoxy group and R is a methylene or propylene radical.

In another embodiment the Alkoxysilane-group-modified polyurethanes are characterised in that only polyoxyalkylene polyols having a number-average molecular weight of 21,000 g/mol to 25,000 g/mol are used in A).

In another embodiment the Alkoxysilane-group-modified polyurethanes are characterised in that the polyethers used in A) have a content of terminal unsaturation of less than 0.02 meq/g and a polydispersity of less than 1.5.

In another embodiment the Alkoxysilane-group-modified polyurethanes are characterised in that 0.90 to 1.10 val of component B) are used.

In another embodiment the Alkoxysilane-group-modified polyurethanes are characterised in that the remaining free NCO groups are further reacted by means of an allophanatisation reaction.

In yet another embodiment the Alkoxysilane-group-modified polyurethanes are used to produce low-modulus sealants.

A further embodiment are polymers obtained by crosslinking the alkoxysilane groups of the polyurethanes according to the embodiment above.

A preparation containing 10 wt. % to 100 wt. % of an alkoxysilane-group-modified polyurethane according to one of claims 1 to 9 or a mixture of two or more such alkoxysilane-group-modified polyurethanes, 0 wt. % to 30 wt. % of a plasticiser or a mixture of several plasticisers, 0 wt. % to 5 wt. % of a moisture stabiliser or a mixture of several moisture stabilisers, 0 wt. % to 5 wt. % of a UV stabiliser or a mixture of several UV stabilisers, 0 wt. % to 5 wt. % of a catalyst or a mixture of several catalysts, 0 wt. % to 80 wt. % of a filler or a mixture of several fillers is yet a further embodiment of the invention.

In another embodiment the preparation is characterised in that it contains a maximum of 30 wt. %, preferably a maximum of 25 wt. %, particularly preferably a maximum of 20 wt. % of plasticiser.

Polyoxyalkylene polyols which can be used according to the invention as polyol component A) are the polyether polyols conventionally used in polyurethane chemistry. These can be obtained in a manner known per se by alkoxylation of suitable starter molecules with base catalysis or the use of double metal cyanide compounds (DMC compounds). Suitable starter molecules for the production of polyether polyols are molecules having at least two epoxide-reactive element-hydrogen bonds or any mixtures of such starter molecules. Suitable starter molecules for the production of polyether polyols are for example simple low-molecular-weight polyols, water, ethylene glycol, propanediol-1,2,2,2-bis(4-hydroxyphenyl)propane, propylene glycol-1,3 and butanediol-1,4, hexanediol-1,6, neopentyl glycol, 2-ethyl hexanediol-1,3, trimethylolpropane, glycerol, pentaerythritol, sorbitol, organic polyamines with at least two N—H bonds, such as for example triethanolamine, ammonia, methylamine or ethylenediamine, or any mixtures of such starter molecules. A suitable alkylene oxide for the alkoxylation is in particular propylene oxide.

Propylene oxide polyethers having on average 1.5 to 3.5 hydroxyl groups, particularly preferably 1.8 to 2.5, are preferred. Polyethers produced by double metal cyanide catalysis generally have a particularly low content of unsaturated end groups of less than or equal to 0.02 milliequivalents per gram of polyol (meq/g), preferably less than or equal to 0.015 meq/g, particularly preferably less than or equal to 0/01 meq/g (determination method ASTM D2849-69), contain markedly fewer monools and generally have a low polydispersity of less than 1.5. The polydispersity can be established by a method known per se to the person skilled in the art, by determining both the number-average molecular weight ($M_n$) and the weight-average molecular weight ($M_w$) by gel permeation chromatography (GPC). The polydispersity is calculated as $PD=M_w/M_n$.

It is preferable according to the invention to use such polyethers produced by double metal cyanide catalysis. Polyethers having a polydispersity of 1.0 to 1.5 are particularly preferred; a polydispersity of 1.0 to 1.3 is most particularly preferred.

Such polyethers are described for example in U.S. Pat. No. 5,158,922 and EP-A 0 654 302.

These polyoxyalkylene polyols can be used in pure form or as a mixture of various polyethers.

All monoisocyanates containing alkoxysilane groups are suitable in principle as compounds B) having isocyanate and alkoxysilane groups. Examples of such compounds are isocyanatomethyl trimethoxysilane, isocyanatomethyl triethoxysilane, (isocyanatomethyl)methyl dimethoxysilane, (isocyanatomethyl)methyl diethoxysilane, 3-isocyanatopropyl trimethoxysilane, 3-isocyanatopropyl methyl dimethoxysilane, 3-isocyanatopropyl triethoxysilane and 3-isocyanatopropyl methyl diethoxysilane. The use of 3-isocyanatopropyl trimethoxysilane is preferred here.

It is also possible to use isocyanate-functional silanes produced by reacting a diisocyanate with an aminosilane or thiosilane, as described in U.S. Pat. No. 4,146,585 or EP-A 1 136 495.

The urethanisation of components A) and B) can optionally be performed with the use of a catalyst. Urethanisation catalysts such as organotin compounds or amine catalysts known per se to the person skilled in the art are suitable as such catalytically active compounds. Organotin compounds which can be cited by way of example are: dibutyl tin diacetate, dibutyl tin dilaurate, dibutyl tin bis-acetoacetonate and tin carboxylates such as for example tin octoate. The cited tin catalysts can optionally be used in combination with amine catalysts such as aminosilanes or 1,4-diazabicyclo[2.2.2]octane.

Dibutyl tin dilaurate is particularly preferably used as the urethanisation catalyst.

The progress of the urethanisation reaction can be monitored by means of suitable measuring instruments installed in the reaction vessel and/or by analysis of samples. Suitable methods are known to the person skilled in the art. They include for example viscosity measurements, measurements of the NCO content, the refractive index, the OH content, gas chromatography (GC), nuclear magnetic resonance spectroscopy (NMR), infrared spectroscopy (IR) and near infrared spectroscopy (NIR). The NCO content of the mixture is preferably determined by titrimetry.

If an excess of component A) is used, the urethanisation of components A) and B) is performed until a complete reaction of the NCO groups of component B) is achieved.

If a substoichiometric amount of component A) is used, the urethanisation of components A) and B) is continued until a complete reaction of the OH groups of the compounds of component A) is achieved. In order to ensure the complete reaction of all OH groups it is preferable to maintain the reaction conditions even after reaching the theoretical NCO content until a constant NCO content is observed.

There are two options for the further breakdown of the NCO content of the reaction product of components A) and B), as described in EP-A 1 924 621: The first option involves the addition of a further NCO-reactive component, which is reacted in a subsequent reaction step with the remaining NCO groups. These can be low-molecular-weight alcohols, for example.

The second option for the further breakdown of the NCO content of the reaction product of components A) and B) is an allophanatisation reaction. Here the remaining NCO groups are reacted with the previously formed urethane groups, preferably by adding an allophanatisation-promoting catalyst.

The alkoxysilane-group-modified polyurethanes according to the invention generally have a viscosity of less than 200,000 mPas, preferably less than 100,000 mPas, measured in each case at 23° C.

The compounds according to the invention are very suitable as binders for the production of low-modulus flexible sealants, preferably for automotive construction and the construction sector. These adhesives crosslink under exposure to atmospheric moisture via a silanol polycondensation reaction. The present invention likewise provides the polymers obtained by this crosslinking reaction; their chemical and physical properties are responsible for the outstanding quality of the seals that are produced.

In order to produce such sealants the alkoxysilane-group-modified polyurethanes according to the invention can be formulated together with the conventional fillers, pigments, plasticisers, desiccants, additives, light stabilisers, antioxidants, thixotropic agents, catalysts, adhesion promoters and optionally further auxiliary substances and additives, by known methods of sealant production.

Precipitated or ground chalks, metal oxides, sulfates, silicates, hydroxides, carbonates and hydrogen carbonates can be used as suitable basic fillers. Further fillers are for example reinforcing and non-reinforcing fillers, such as carbon black, precipitated silicas, pyrogenic silicas, silica flour or various fibres. Both the basic fillers and the further reinforcing or non-reinforcing fillers can optionally be surface-modified. Precipitated or ground chalks and pyrogenic silicas can particularly preferably be used as basic fillers. Mixtures of fillers can also be used.

Examples of suitable plasticisers are phthalic acid esters, adipic acid esters, alkyl sulfonic acid esters of phenol or phosphoric acid esters. Long-chain hydrocarbons, polyethers and vegetable oils can also be used as plasticisers. Owing to the particular properties of the polymers according to the invention the proportion of plasticiser in the sealant formulation can be limited to ≤30 wt. %, preferably to ≤25 wt. %, particularly preferably to ≤20 wt. %.

Pyrogenic silicas, polyamides, secondary products of hydrogenated castor oil or polyvinyl chloride can be cited by way of example as thixotropic agents.

All organometallic compounds and amine catalysts which are known to promote silane polycondensation can be used as suitable curing catalysts. Particularly suitable organometallic compounds are in particular compounds of tin and titanium. Preferred tin compounds are for example: dibutyl tin diacetate, dibutyl tin dilaurate, dioctyl tin maleate and tin carboxylates such as for example tin(II) octoate or dibutyl tin-bis-acetoacetonate. The cited tin catalysts can optionally be used in combination with amine catalysts such as aminosilanes or 1,4-diazabicyclo[2.2.2]octane. Preferred titanium compounds are for example alkyl titanates, such as diisobutyl bis-ethyl acetoacetate titanate. Where amine catalysts are used on their own, those having a particularly high base strength are particularly suitable, such as amines having an amidine structure. Preferred amine catalysts are therefore 1,8-diazabicyclo[5.4.0]un-dec-7-ene or 1,5-diazabicyclo[4.3.0]non-5-ene, for example.

Alkoxysilyl compounds such as vinyl trimethoxysilane, methyl trimethoxysilane, i-butyl trimethoxysilane, hexadecyl trimethoxysilane can be cited in particular as desiccants.

The known functional silanes such as for example aminosilanes, epoxy silanes and/or mercaptosilanes or mixtures of functional silanes are used as adhesion promoters.

The examples below illustrate the present invention without limiting its scope.

EXAMPLES

Unless otherwise specified, all percentages are percentages by weight.

The viscosity measurements were performed in accordance with ISO/DIN 3219:1990 at a constant temperature of 23° C. and a constant shear rate of 250/sec with a Physica MCR cone/plate rotary viscometer (Anton Paar Germany GmbH, Ostfildern, DE) using a CP 25-1 measuring cone (diameter 25 mm, cone angle 1°).

The ambient temperature of 23° C. prevailing at the time the experiments were performed is designated RT.

Commercial products used:

| Chemical name/function | Name/brand | Supplier |
|---|---|---|
| Isocyanatopropyl trimethoxysilane | Geniosil ® GF40 | Wacker Chemie AG, DE |
| Dibutyl tin dilaurate | Desmorapid ® Z | Bayer MaterialScience AG, DE |
| CaCO$_3$-based filler | Socal ® U$_1$S$_2$ | Solvay AG, DE |
| Adhesion promoter | Dynasylan ® 1146 | Evonik Industries AG, DE |
| Desiccant | Dynasylan ® VTMO | Evonik Industries AG, DE |
| Catalyst | Lupragen ® N700 | BASF SE, DE |
| Plasticiser | Jayflex ™ DINP | Exxon Mobil Chemical Corp., USA |

Example 1 (According to the Invention)

A mixture of 977.9 g of polypropylene glycol with a hydroxyl value of 5.5 mg KOH/g and a molecular weight of 20,400 and 0.05 g of dibutyl tin dilaurate (Desmorapid® Z) was heated to 60° C. in a 2-liter sulfonating beaker with lid, stirrer, thermometer and nitrogen flow. Then 22.1 g of isocyanatopropyl trimethoxysilane (Geniosil® GF40) were added and the mixture was prepolymerised until the theoretical NCO content of 0.05% was reached. Then 0.4 g of methanol were added to trap the excess NCO groups. The mixture was stirred until an NCO content could no longer be detected by titrimetry.

The polyurethane prepolymer with alkoxysilane end groups that was obtained had a viscosity of 53 Pas (23° C.).

Example 2 (According to the Invention)

A mixture of 979.3 g of polypropylene glycol with a hydroxyl value of 5.1 mg KOH/g and a molecular weight of 22,000 and 0.05 g of dibutyl tin dilaurate (Desmorapid® Z) was heated to 60° C. in a 2-liter sulfonating beaker with lid, stirrer, thermometer and nitrogen flow. Then 20.8 g of isocyanatopropyl trimethoxysilane (Geniosil® GF40) were added and the mixture was prepolymerised until the theoretical NCO content of 0.05% was reached. Then 0.4 g of methanol were added to trap the excess NCO groups. The mixture was stirred until an NCO content could no longer be detected by titrimetry. The polyurethane prepolymer with alkoxysilane end groups that was obtained had a viscosity of 105 Pas (23° C.).

Comparative Example 1 (Not According to the Invention)

A mixture of 975.5 g of polypropylene glycol with a hydroxyl value of 6.2 mg KOH/g and a molecular weight of 18,100 and 0.05 g of dibutyl tin dilaurate (Desmorapid® Z) was heated to 60° C. in a 2-liter sulfonating beaker with lid, stirrer, thermometer and nitrogen flow. Then 24.5 g of isocyanatopropyl trimethoxysilane (Geniosil® GF40) were added and the mixture was prepolymerised until the theoretical NCO content of 0.05% was reached. Then 0.4 g of methanol were added to trap the excess NCO groups. The mixture was stirred until an NCO content could no longer be detected by titrimetry. The polyurethane prepolymer with alkoxysilane end groups that was obtained had a viscosity of 35 Pas (23° C.).

Determination of the Skinning Time

A film is applied with a knife (200 μm) to a glass plate previously cleaned with ethyl acetate and immediately placed in the drying recorder. The needle is loaded with a weight of 10 g and moves over a 35 cm section for a period of 24 hours.

The drying recorder is located in a climate-controlled room at 23° C. and 50% relative humidity.

The skinning time is given as the time at which the continuous trace of the needle disappears from the film.

Application Examples

In order to assess the application-related properties of the various polymers they were processed in the following formulation:

|  | Amount in wt. % |
|---|---|
| Polymer | 26.6 |
| Filler (Socal® $U_1S_2$) | 47.2 |
| Plasticiser (Jayflex™ DINP) | 22.4 |
| Desiccant (Dynasylan® VTMO) | 2.4 |
| Adhesion promoter (Dynasylan® 1146) | 1.3 |
| Catalyst (Lupragen® N 700) | 0.1 |

In order to produce the formulation, filler (Socal® $U_1S_2$), plasticiser (Jayflex™ DINP) and desiccant (Dynasylan® VTMO) are added to the binder and the constituents are mixed in a high-speed vacuum mixer with wall scraper at 3000 rpm. The adhesion promoter (Dynasylan® 1146) is then added and mixed in for 5 min at 1000 rpm. Lastly the catalyst (Lupragen® N700) is stirred in at 1000 rpm and the finished mixture is then deaerated under vacuum.

Both 2 mm-thick membranes and specimens on a glass substrate in accordance with DIN EN ISO 11600 are produced to measure the physical properties. The Shore hardness is tested on the membranes in accordance with DIN 53505. The modulus at 100% elongation is measured in accordance with DIN EN ISO 11600 at 23° C.

The results obtained are shown in the table below:

| | Example no. | | |
|---|---|---|---|
| Polymer from | 3<br>Example 1 | 4<br>Example 2 | 5<br>Comparative example 1 |
| Shore A hardness | 19 | 17 | 26 |
| 100% modulus [N/mm²] | 0.4 | 0.3 | 0.6 |
| Skinning time [min] | 60 | 55 | 60 |

In a further example the proportion of plasticiser was reduced to below 20 wt. %:

Example 6 (According to the Invention)

|  | Amount in wt. % |
|---|---|
| Polymer (from Example 2) | 28.8 |
| Filler (Socal® $U_1S_2$) | 48.8 |
| Plasticiser (Jayflex™ DINP) | 18.6 |
| Desiccant (Dynasylan® VTMO) | 2.4 |
| Adhesion promoter (Dynasylan® 1146) | 1.3 |
| Catalyst (Lupragen® N 700) | 0.1 |

The sealant obtained with this low-plasticiser formulation has the following mechanical properties:

| | Example no.<br>6 |
|---|---|
| Shore A hardness | 19 |
| 100% modulus [N/mm²] | 0.4 |
| Skinning time [min] | 70 |

The invention claimed is:

1. An alkoxysilane-group-modified polyurethane obtained by reacting
    C) 1.0 eq of a polyol component having a number-average molecular weight of from greater than 20,000 g/mol to 30,000 g/mol, comprising one or more polyoxyalkylene polyols or polyoxyalkylene polyol prepolymers and
    D) 0.80 to 1.20 eq of a compound of formula (I) comprising isocyanate and alkoxysilane groups

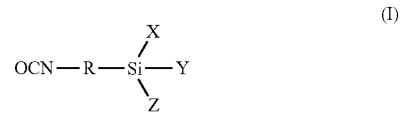

wherein
    X, Y, Z
        are, independently of one another, linear, cyclic or branched $C_1$-$C_8$ alkyl or $C_1$-$C_8$ alkoxy radicals, wherein at least one of the radicals is a $C_1$-$C_8$ alkoxy group, and X, Y or Z are optionally, independently of one another, bridged, and
    R
        is any at least difunctional organic radical,
    and wherein the polyethers used in A) have a content of terminal unsaturation of less than 0.02 meq/g and a polydispersity of less than 1.5.

2. The alkoxysilane-group-modified polyurethane of claim 1, wherein X, Y and Z in formula (I) are, independently of one another, a methoxy or ethoxy group and R is a methylene or propylene radical.

3. The alkoxysilane-group-modified polyurethane of claim 1, wherein only polyoxyalkylene polyols having a number-average molecular weight of from 21,000 g/mol to 25,000 g/mol are used in A).

4. The alkoxysilane-group-modified polyurethane of claim 1, wherein 0.90 to 1.10 eq of component B) are used.

5. The alkoxysilane-group-modified polyurethane of claim 1, wherein any remaining free NCO groups are further reacted by means of an allophanatisation reaction.

6. A low-modulus sealant comprising the alkoxysilane-group-modified polyurethane of claim 1.

7. A polymer obtained by crosslinking the alkoxysilane groups of the polyurethanes of claim 1.

8. A preparation comprising
- from 10 weight % to 100 weight % of at least one alkoxysilane-group-modified polyurethane of claim 1;
- from 0 weight % to 30 weight % of a plasticiser or a mixture of several plasticisers;
- from 0 weight % to 5 weight % of a moisture stabiliser or a mixture of several moisture stabilisers;
- from 0 weight % to 5 weight % of a UV stabiliser or a mixture of several UV stabilisers;
- from 0 weight % to 5 weight % of a catalyst or a mixture of several catalysts; and
- from 0 weight % to 80 weight % of a filler or a mixture of several fillers,
- wherein the preparation has a modulus at 100% elongation of a maximum of 0.4 N/mm$^2$ determined according to ISO 11600.

9. The alkoxysilane-group-modified polyurethane of claim 1, wherein R is a straight-chain, branched or cyclic alkylene radical having 1 to 8 carbon atoms.

10. The preparation of claim 8, wherein said preparation comprises a maximum of 25 weight % of a plasticiser.

11. The preparation of claim 8, wherein said preparation comprises a maximum of 20 weight % of a plasticiser.

* * * * *